INVENTORS
JAMES G. BARCOMB
EUGENE T. KOZOL
BY Ronald J. Clark
AGENT

May 30, 1967 J. G. BARCOMB ET AL 3,323,119

DISPLAY SYSTEM FOR A DATA PROCESSING UNIT

Filed Dec. 30, 1963 7 Sheets-Sheet 2

May 30, 1967 J. G. BARCOMB ET AL 3,323,119

DISPLAY SYSTEM FOR A DATA PROCESSING UNIT

Filed Dec. 30, 1963 7 Sheets-Sheet 3

May 30, 1967 J. G. BARCOMB ET AL 3,323,119

DISPLAY SYSTEM FOR A DATA PROCESSING UNIT

Filed Dec. 30, 1963 7 Sheets-Sheet 4

May 30, 1967 J. G. BARCOMB ET AL 3,323,119

DISPLAY SYSTEM FOR A DATA PROCESSING UNIT

Filed Dec. 30, 1963 7 Sheets-Sheet 6

May 30, 1967 J. G. BARCOMB ET AL 3,323,119

DISPLAY SYSTEM FOR A DATA PROCESSING UNIT

Filed Dec. 30, 1963 7 Sheets-Sheet 7

3,323,119
DISPLAY SYSTEM FOR A DATA PROCESSING UNIT

James G. Barcomb, Endicott, and Eugene T. Kozol, Binghamton, N.Y., assignors to International Business Machines Corporation, New York, N.Y., a corporation of New York Filed Dec. 30, 1963, Ser. No. 334,344
6 Claims. (Cl. 340—324)

ABSTRACT OF THE DISCLOSURE

The present invention discloses an improved display system for a data processing unit comprising a plurality of input/output terminals and an interlock circuit whereby only one terminal may communicate with the processing unit at one time. A plurality of deflection currents and their corresponding combining circuits operate to correctly position a CRT beam to display the requested information.

This invention relates to information storage and retrieval systems and, more particularly to a retrieval system employing a dark trace cathode ray tube for displaying the retrieved information.

Data processing systems may operate to store a large volume of information and to answer inquiries made thereto by retrieving certain of the stored information. Quick access to the stored information and fast write out of the requested information increases the versatility of the system and the number of inquiries that a system can answer.

It is not always necessary to make a permanent record of the requested information. Therefore, writing the requested data on the face of a display tube provides a very fast means of transferring the requested information from the central processor into a readable format. An example of such a situation wherein a permanent record is not needed is easily found in an inventory system wherein the availability and the quantity of such items are sought. In this example, an inquiry is made to the central processor by identifying the part number of the item. The processor finds the data pertaining to this item and displays it on a tube for visual reading. Additionally, many types of bill inquiry situations are possible wherein a customer wishes to know his current balance and the individual items charged thereon.

It is a principal object of the instant invention to provide a data processing system suitable for retrieving a portion of its stored information and for displaying the retrieved information on a dark trace cathode ray tube.

It is another object of the present invention to display the retrieved information in a legible manner on a dark trace tube.

It is a further object of the instant invention to provide a storage and retrieval system which has a plurality of inquiry and display terminals, which terminals are remote from the central storage facility.

It is a still further object of the instant invention to provide a display system which is capable of operating at the same rate as the central electronic data processor.

It is yet another object of the instant invention to provide an inquiry and display system having a privacy feature whereby only one inquiry station is activated and is accessible to the central processor at any one time, and the requested information is displayed only at the activated inquiry station.

It is a further object of the instant invention to provide an economical retrieval system by sharing circuitry among certain of the inquiry and display terminals.

The foregoing and other objects, features and advantages of the invention will be apparent from the following more particular description of a preferred embodiment of the invention as illustrated in the accompanying drawings.

Figure 1:
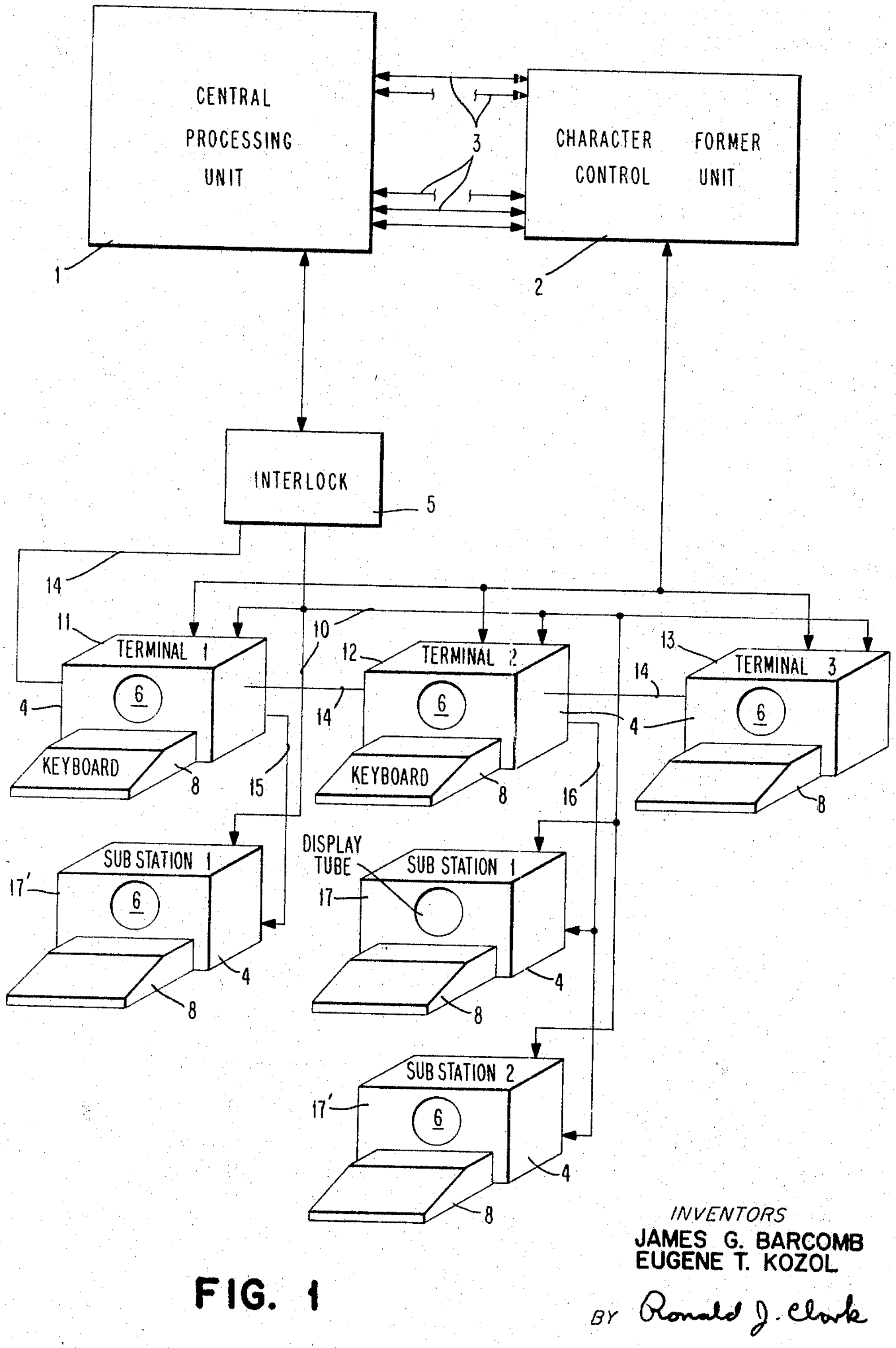
FIG. 1 shows a general block diagram of the instant invention.
Figure 3:
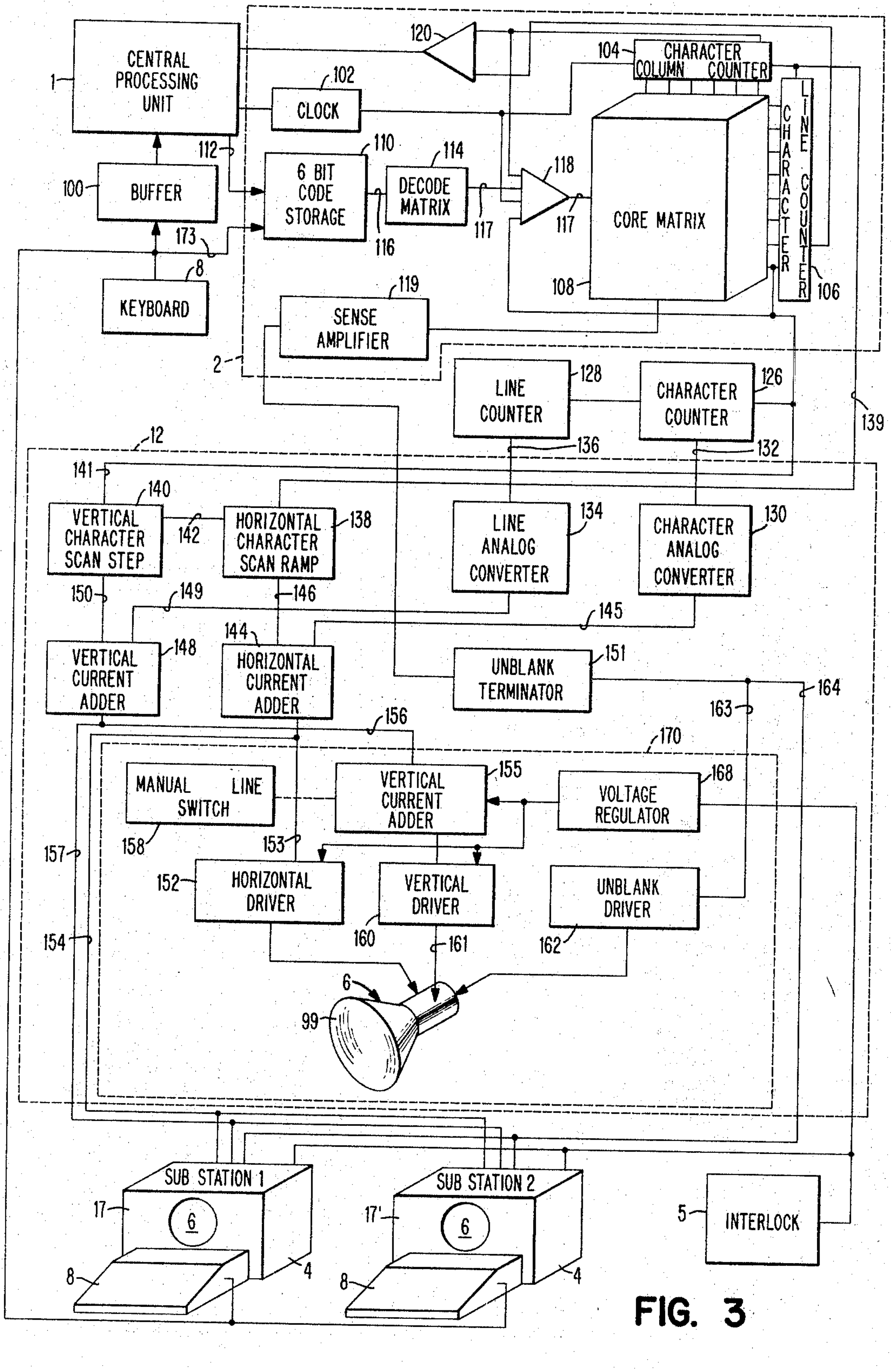
Figure 4:
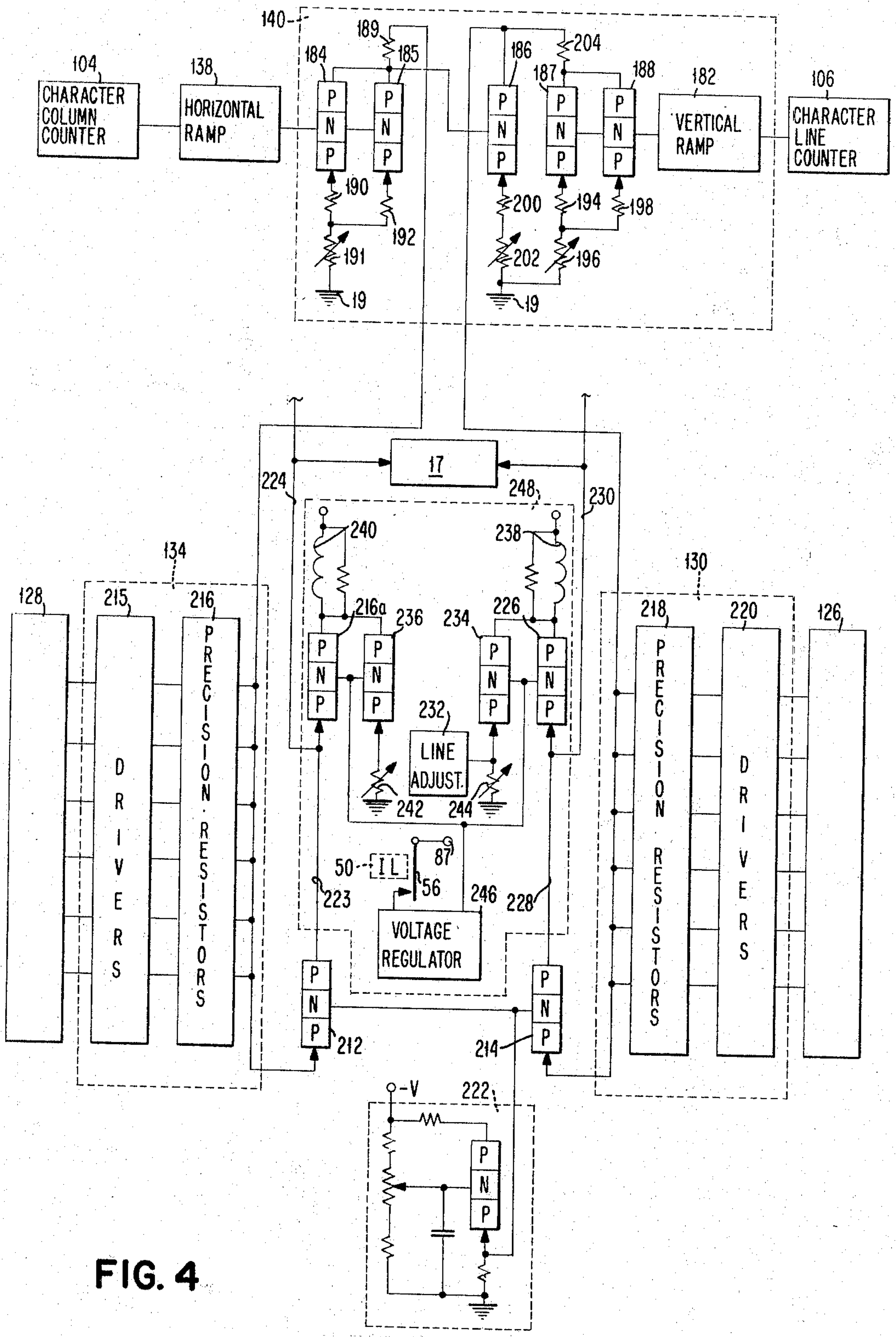
Figure 7:
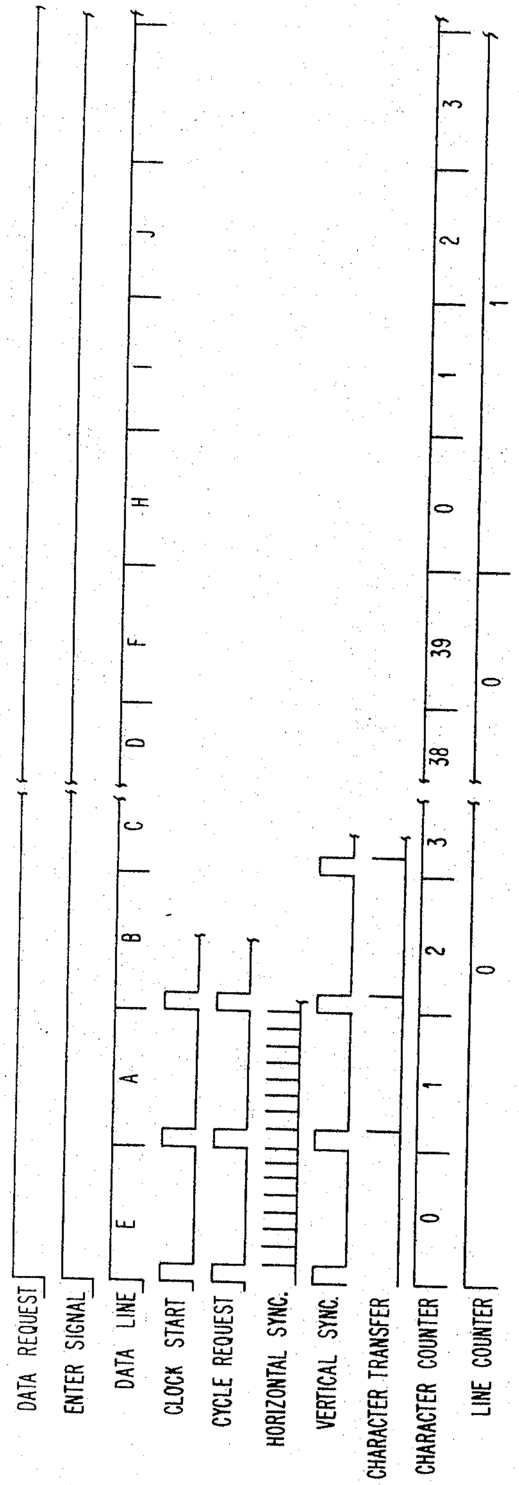
Figure 5:
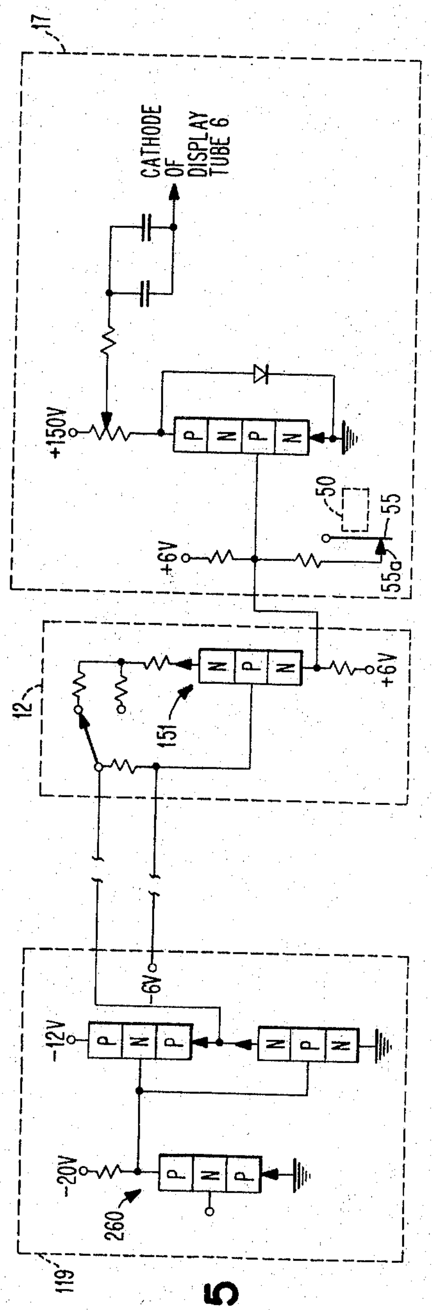
Figure 6:
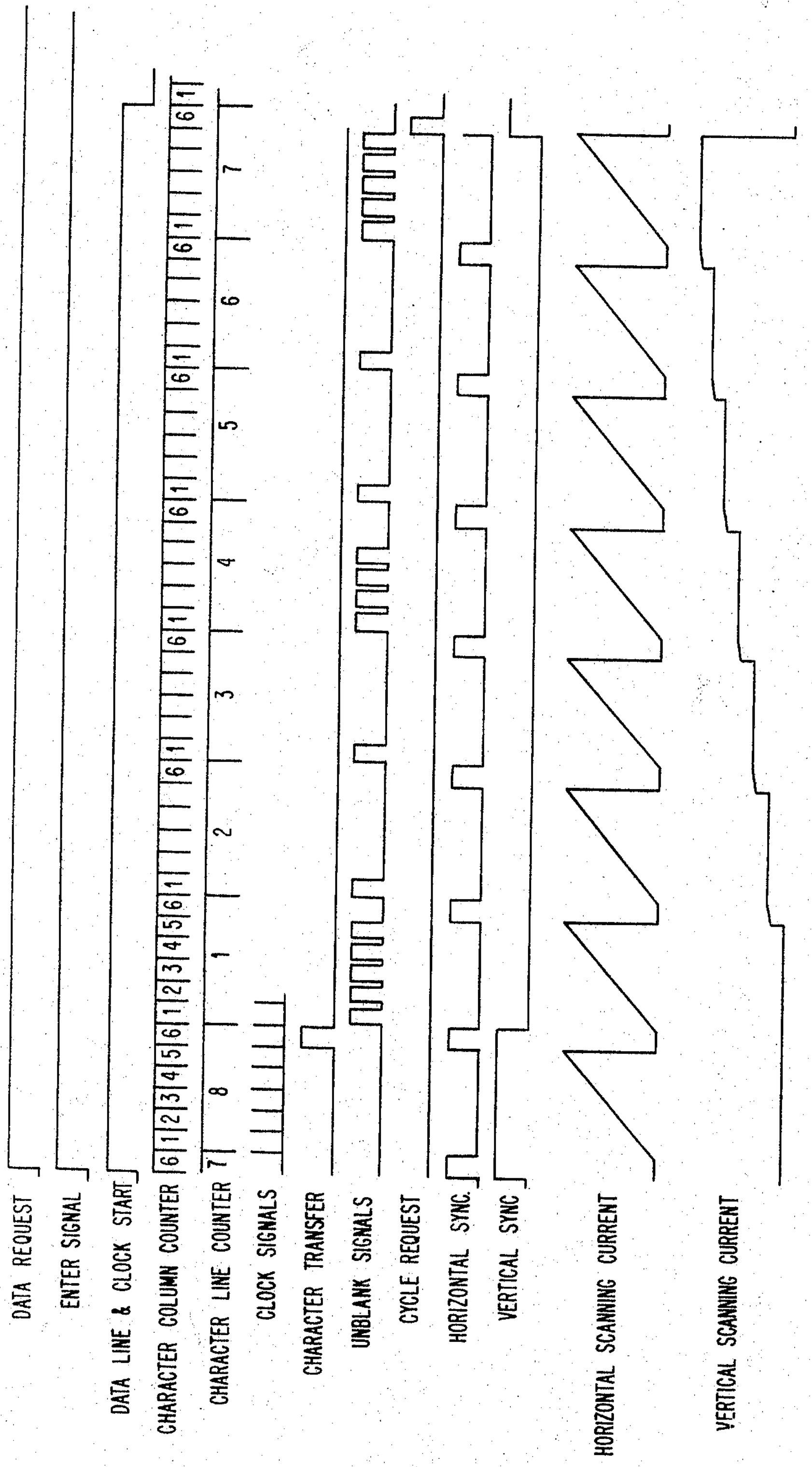
Figure 8:
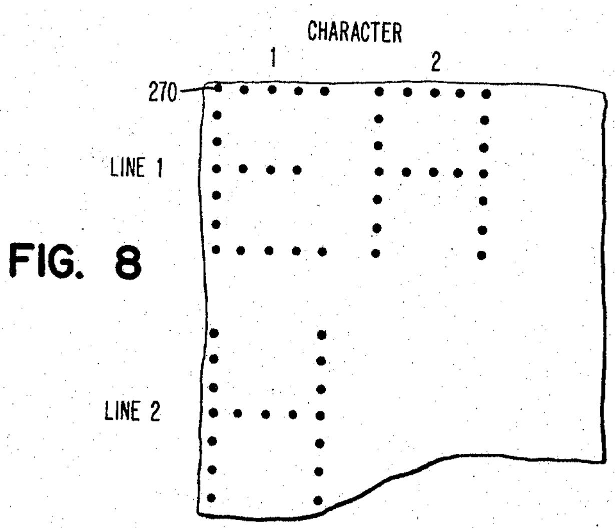
Figure 9:
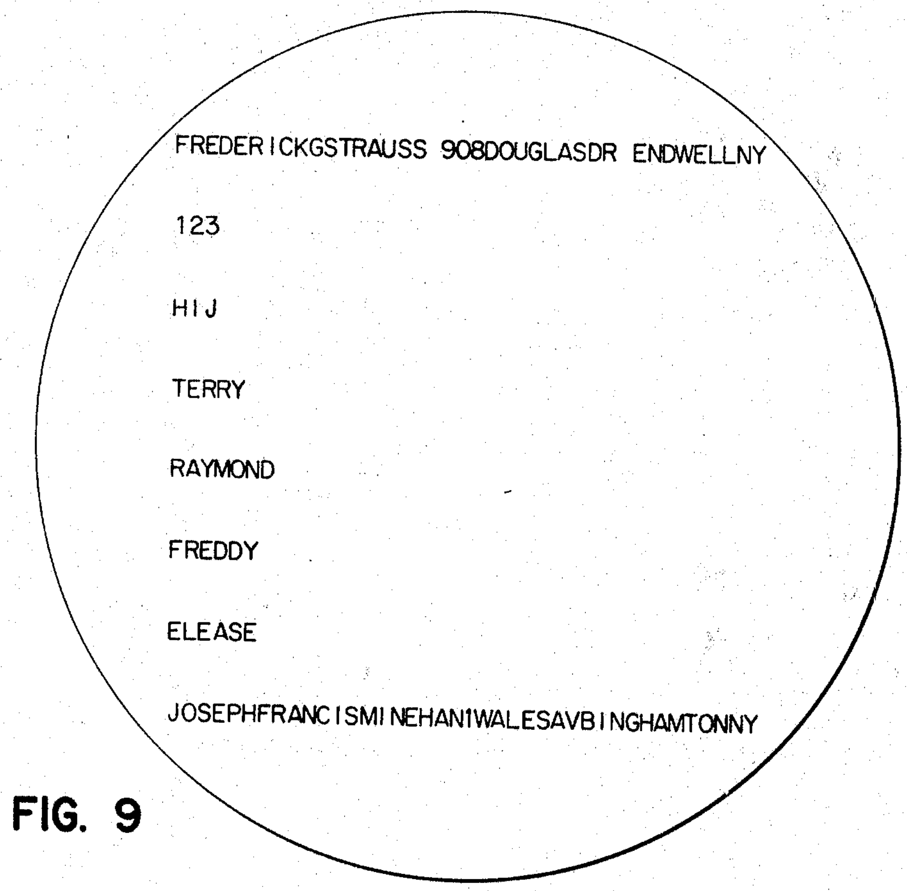

FIG. 3 shows a more detailed block diagram specifying the circuits required to display successive characters on the face of the tubes shown in FIG. 1, FIG. 4 is a schematic diagram of the current adder and the current sharing circuits employed in the instant invention, FIG. 5 is a schematic diagram of the unblank circuit used in the instant invention, FIGS. 6 and 7 are timing diagrams showing the synchronism of the various circuits employed, and FIGS. 8 and 9 show the display tube having a few characters written thereon by the instant invention.

*Description*

Briefly, the instant invention comprises a data processing unit employed to store data files and programmed to answer inquiries for retrieval of certain of these data files. A plurality of inquiry and display units are connected directly to the central processor or are connected to the central processor by means of an intervening buffer storage unit. Since the inquiries are made by means of a keyboard arrangement, the buffering unit can be employed to store the signals from the slower acting keyboard until the message is complete, and then the buffer transfers the message to the central processor at a rate compatible with the operating speed of the computer.

Various signal translators are dispersed throughout the system in order to achieve compatibility between the various units employed in the system. As previously mentioned, a keyboard is employed to make an inquiry into the central processor. Therefore, a standard translator is employed whereby the signals generated by the depression of a key on the keyboard are changed into a set of signals which are handled by the processing unit. Additionally, a character former is employed to change the normal code of the central processor into a serial code suitable for handling by the display station in writing the retrieved information on its associated dark trace CRT.

Only a single inquiry and display unit can operate with the data processor at one time. The remaining units are disconnected from the processor by a relay interlocking system. The system permits the requested data to be displayed only on the requesting station, while it prevents the remaining unitsfrom receiving the requested data by removing certain of their energizing potentials. Additionally, the instant invention practices circuit sharing techniques whereby certain of the display units share a portion of their wave shaping circuits with the remaining display units. In the later portion of the description, the units which contain the shared circuits are identified as terminals, and the remaining units are identified as substations.

Referring to FIG. 1 there can be seen a central processing unit 1 is employed in the instant invention as a source of data files. A character former control unit 2 is connected to the processing unit 1 by means of six parallel lines 3. A plurality of display stations 4 are shown connected in common with the control unit 2. Any one of the display stations may be connected to the computer by means of an interlock system 5. Each of the stations 4 is equipped with a dark trace tube 6, which tube is employed to display the information from the processing unit 1. The tube 6 is identified as a 7BEP10 tube and it is equipped with a coating which darkens when struck by an electron beam. Additionally, the tube retains an image for a considerable length of time. As the information in the processing unit is not in a format suitable for achieving a display on the dark trace tube 6, the character former control unit 2 changes the machine format of the unit 1 into a format suitable for display. The character former 2 transforms the parallel signals of the processing unit 1 into a serial signal which is then used as the unblank signal for the electron beam in the selected display station. Additionally, the control unit 2 generates signals for positioning the electron beam of the selected station across successive character positions and successive character lines on the display tube. The unblanking of the moving electron beam excites the coating of the tube and writes the requested information thereon.

The general operation of the circuit shown in FIG. 1 is initiated at a keyboard 8 employed in each display unit 4. The keyboard is connected by means of the character former control unit 2 to the central processor 1 and is employed to request data from the computer. The computer is programmed to accept such requests and to search and to locate the requested data. The processing unit 1 applies the retrieved data to the control unit 2 by means of the lines 3. The control unit 2 changes the parallel signal into a serial combination of signals to represent each character from the computer, and generates the additional beam positioning signals. Both the digital positional signals and the unblanking signals are applied to a selected display station 4 under control to the interlock circuit 5.

The interlock circuit 5 is connected partially in parallel with the display station 4 by a parallel circuit identified by a line 10, and partially in series with certain of the display stations 11, 12 and 13 by means of a line 14. The stations 11 and 12 contain circuits which are shared by the remaining stations connected thereto by lines 15 and 16, respectively. The stations 11, 12 and 13 are further identified as terminal stations.

For purposes of this description, the station 4 selected to display information is further identified as a substation 17. Additionally, the showing of only three strings of terminal stations 11, 12 and 13 is not meant to limit the number of terminals which can be employed in the instant invention. As a practical matter it has been found that ten terminals can be used and that each terminal may be associated with five substations 17'.

Figure 2:
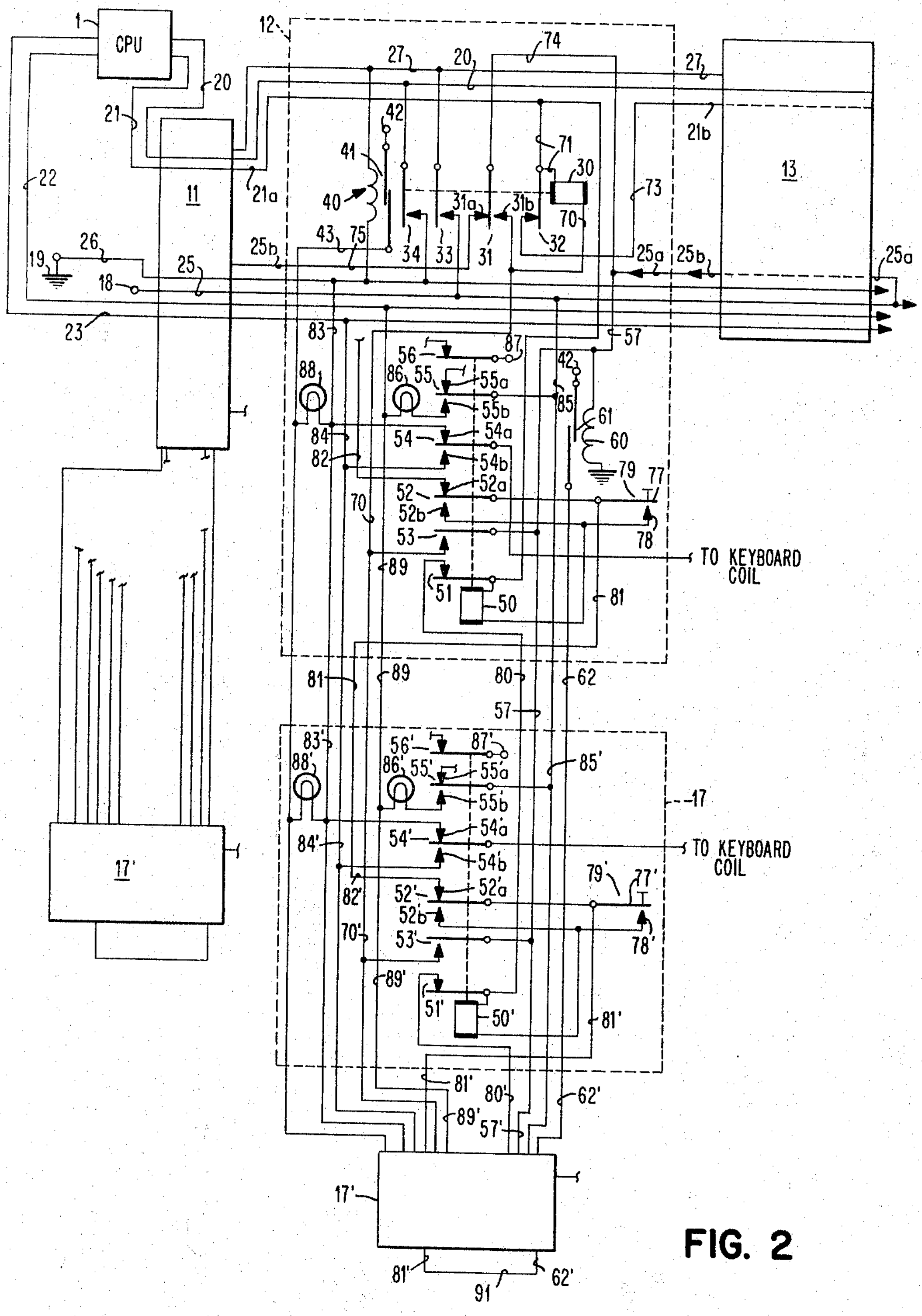
FIG. 2 is a schematic diagram of the interlock circuit.

Referring to FIG. 2, there can be seen a schematic diagram of the interlock circuit 5 employed in the instant invention. The interlock circuit is shown in great detail with reference to the selected substation 17 and the terminal 12 with which it shares certain circuits. The remaining deactivated terminals 11 and 13 and deactivated substation 17' are shown in block form. However, each of these deactivated units is equipped similarly as its respective activated units and its interconnection is the same as shown between terminal 12 and substation 17. Moreover, the interlock system shown in FIG. 2, may be expanded for additional terminal positions and substation positions by connecting the additional units to the existing units in a similar manner as shown for the existing stations.

The interlock circuit 5 operates partially under the control of the central processing unit 1 and partially under the control of local voltage sources 18 and 19. These voltages are a relay drive voltage and a ground return respectively. The control signals associated with the processing unit 1 are applied to the terminals 11, 12 and 13 by a plurality of lines 20 through 23, and the voltage levels 18 and 19 are applied to the terminals 11, 12 and 13 by lines 25 and 26 respectively.

The signal available on line 20 originates in the selected substation 17 and requests that the processing unit 1 accept an inquiry for data. Upon the initiating of such a request signal, the terminal 12 generates a busy line signal for application to all other display units over a line 27. This busy line signal will be applied to the terminals 11, 12 and 13, and the substations 17 to alert them that one of their number is presently connected to the central processing unit 1.

A relay select and reset signal is carried by line 21. Initially, this signal is available to all of the terminals 11, 12 and 13. However, upon the activation of terminal 12, the relay select and reset signal is removed from terminal 13 by the opening of line 21 within the terminal 12. Therefore, 21*a* identifies the portion of the line 21 coming from the terminals 11 and 21*b* identifies the portion of the line 21 which connects the activated terminal 12 to the terminal 13. The removal of this signal from the portion 21*b* prevents the simultaneously activation of the terminal 13 connected thereto.

The relay drive voltage 18 is applied initially to the terminal 11 by means of a line 25, and then in sequence to all the remaining terminals in a parallel configuration. However, line 25 is not only connected to the last terminal 13 in parallel but also in series. The portion of line 25 entering the terminal 13 to make the series connection is identified as 25*a*, and its continuation after passing through a terminal is identified as 25*b*. Since the series connection begins with the terminal 13 furthest away from the central processing unit 1, and then passes through the terminals progressively closer to the unit 1, the opening of this series connection within the terminal 12 removes the relay drive voltage from the terminal 11 and thereby prevents its activation. A suitable relay drive voltage may be at a level of —20 volts.

An enter light signal is carried by the line 22. This signal originates in the unit 1 in response to the request signal on line 20 when the unit 1 is prepared to answer a request for data. A keyboard control signal is available on line 23 for application to each display unit in controlling the operation of its keyboard 8. And finally, the ground return 19 is available to each of the terminals 11, 12 and 13 on line 26.

The interlock components associated with the terminal 12 are shown in full detail in FIG. 4, and include a terminal lockout relay 30, a busy light relay 40, a substation control relay 50, and a select relay 60. The relay 30 has associated therewith a plurality of relay positions indicated generally at 31, 32, 33 and 34. Each position, except position 31, is equipped with a single stationary contact and a corresponding movable contact as normally found in standard relays. Position 31 has a pair of stationary contacts indicated at 31*a* and 31*b*, and a single movable contact.

The relay 40 has a single relay position 41 which is normally open. One contact is connected to a source of negative potential 42, and the other contact is connected to a line 43. The potential source 42 may be at a level of —48 volts.

The relay 50 is provided with a plurality of relay positions 51 through 56. Positions 51, 53 and 56 are equipped with a single stationary contact and a single movable contact. Positions 52, 54 and 55 are equipped with a pair of stationary contacts and a single movable contact. One stationary contact of each of these last mentioned positions is indicated with an *a* character added to the position number, and the remaining contact is indicated with a *b* character added in like manner. The coil of the select relay 60 is connected between the line 25*a* and ground 19, and it is equipped with a single position 61. One contact of position 61 is connected to a source of negative potential 42 and the other contact is connected to line 62.

The interlock circuit for the terminal 12 is described in detail. The detailed description is followed by a further description of the steps required for adding substations to the existing interlock circuit.

One side of the coil winding of the relay 30 is connected to the stationary contact 31b by a line 70, and the other side of the coil is connected to the movable contact 32 and to line 21a by means of a line 71. The stationary contact 32 is connected to line 21b by means of a line 73. The movable contact 31 is connected to line 25a, entering the terminal 12, by means of a line 74, and the stationary contact 31a is connected to the line 25b, leaving the terminal 12, by a line 75. The stationary contact 33 is connected directly to the line 25, and the movable contact 33 is connected directly to the line 27. The stationary contact 34 is connected to the line 26, and its associated movable contact is connected to the line 20.

One side of the coil of relay 50 is connected to the stationary contact 78 of the manually operable enter switch 79, and to the stationary contact 52b of the relay 50. The other side of the coil is connected to the movable contact 51 and the line 21a. The stationary contact 51 is connected to a line 80. The movable contact 53 is connected to the line 25a by a line 57, and the stationary contact of position 53 is connected to the line 70. The movable contact of position 52 is connected to the movable contact 77 of the switch 79 and to a line 81. The stationary contact 52a is connected to a line 82. The movable contact for position 54 is connected to the keyboard coils of its associated keyboard 8. The normally closed stationary contact 54a of position 54 is connected to line 26 by a line 83, and the normally open stationary contact 54b is connected to the line 23 by a line 84. The movable contact 55 is connected to the line 25 by a line 85, and the normally open stationary contact 55b is connected to one side of an enter light 86, while the other normally closed stationary contact 55a is connected to the unblank circuit shown in greater detail in FIG. 5. The movable contact 56 is connected to a potential source 87, and the stationary contact 56 is connected to a voltage regulator shown in FIG. 4. A suitable potential source 87 may be at a level of −20 volts. A busy light 88 is connected across lines 43 and 83, and a line 89 connects the remaining side of the enter light 86 to the line 22.

All the lines passing vertically from the terminal 12 are available for adding additional substations 17 and 17′ in parallel to the previously described terminal 12. Similar components located in the additional substations are connected in parallel between these lines and are identified with the same numbers employed to identify the components used in the terminal 12 except raised to the prime. However, certain special connections are made and these will be given added attention. The first such special connection occurs at the substation 17′ and consists of the interconnection of line 81 and 62 as indicated by a line 91. The other special connection concerns the movable contact 51′ of any display unit 17 attached to the terminal and to subsequent units also attached thereto. Movable contact 51 was described as being connected to line 21a. However, on subsequent units, movable contact 51′ is connected to the line 80 of the next preceding unit as indicated by line 94.

The activation of the substation 17 shown in FIG. 2 is begun by the manual operation of the request switch 79′, and the connection of one side of the relay coil 51′ to the potential source 42 by means of the request switch 79′, lines 81′, 91, 62′ and 62 and contacts 61. The other side of the coil of relay 50′ is connected to line 21a by means of lines 94 and 80 and position 51 of relay 50. Line 21a at this time carries a ground level signal, therefore relay 50′ is activated and all its positions are changed. The normally closed connection between stationary contact 52a′ and movable contact 52′ is broken thereby removing the relay drive signal from the switch 79 located in the terminal 12. Concurrently, a connection is made between movable contact 52′ and stationary contact 52b′, thereby connecting the relay drive signal to the coil of relay 50′ so that the relay would remain activated after the manual pressure is removed from the switch 79′.

The normally closed connection between the movable contact 51′ and the stationary contact 51′ is broken, thereby opening the line 80′ and removing a ground connection to one side of the relay 50′ in the next lower adjacent substation 17′. The removal of this connection is best illustrated by reference to line 80 and its manner of connection between the terminal 12 and the substation 17.

The opening of line 81 between the substation 17 and the terminal 12, and the opening of the line 80′ between the substation 17 and the next lower substation 17′ has effectively rendered all these units inoperable other than the substation 17.

The normally open connection at position 53′ of relay 50′ is closed, thereby connecting line 25a to line 70 by means of line 57 and position 53′. This connection energizes relay 30 which activates and operates its positions 31 to 34. The connection between the stationary contact 31a and movable contact 31 is broken, thereby disconnecting line 25a from 25b and effectively removing the relay drive signal from the relay 60′ located in the terminal 11. A connection is made between contacts 31 and 31b, which causes the relay 30 to be activated by means of one of its own contact positions. The normally closed connection at position 32 is opened, thereby breaking line 21 and deactivating the line 21b which effectively removes the set and reset signal from the relay 30′ in the terminal 13. The removal of this signal prevents terminal 13 from being activated.

The normally open position 33 closes and applies the relay drive signal from line 25 to line 27, which in turn applies this signal to the relay 40 and 40′ located in terminals 11, 12 and 13. The relay 40 activates and closes its normally open position 41, thereby connecting a voltage level from potential source 42 to each busy light 88 connected thereto. The normally open position 34 closes and connects line 26 to line 20, which connection is interpreted by the unit 1 as a request for entry into the unit 1. When the unit 1 is ready to acknowledge this request, a signal is set out on line 22 which lights the entry light 86 by means of the connection to line 25 as made through contacts 55b and 55. Additionally, the central processing unit 1 sends out a signal over line 23 which is applied to the keyboard coils of its associated keyboard by means of the connection made by contacts 54b and 54. It is at this time that the keyboard 11 associated with the substation 17 is ready to make a request for data into the unit 1.

When the interlock circuit 5 is to be reset, the relay select and reset signal on line 21 changes from ground level to a −45 volts, thereby causing relays 30 and 50 to drop out and to release relays 40 and 60. Then all of the terminals and substations are free to send a request to the CPU 1. The select and reset signal originates in the processing unit 1.

FIG. 3 shows in more detail the circuitry employed to effect the orderly presentation of data onto a display portion 99 of the dark trace tube 6. The keyboard 8 is shown connected to a buffer 100. Requests are manually compiled with the keyboard and entered into the buffer 100. The buffer 100 momentarily stores successive portions of the request until it is completely compiled and then the buffer transfers the entire request in proper machine code into the central processor 1. The processing unit 1 searches and finds the requested information. When it is ready to answer the request, the processing until sends a timing signal to a clock 102 associated with the character former control unit 2. The clock pulse signifies that the processing unit 1 is ready to send its information for display. The clock 102 is connected in cascade to a counter 104 and a counter 106. The counter 104 is a six-position decimal counter and is standard in construction. That is, the counter advances one position for each received pulse from the clock 102 and simultaneously energizes its drive line connected to the energized position. The counter 106 is an eight-position decimal counter and corresponds in construction with the counter 104. The drive lines of the counters 104 and 106 are employed to interrogate a core matrix 108. The core matrix includes a plurality of magnetic cores arranged in columns and lines. For the purposes of this discussion, the columns are positioned vertically in FIG. 3 and the lines are positioned horizontally. The first drive line of the counter 104 intersects and threadedly engages the first column of the magnetic cores in the matrix 108. The remaining drive lines of the counter 104 are similarly connected to adjacent columns of cores in the matrix 108 except the last drive line. This line does not engage a corresponding column of cores and its function is explained later in this description. The first drive line of the counter 106 intersects and threadedly engages the first row of cores in the core matrix 108. This row of cores comprises the first core in each column of the matrix. Succeeding drive lines of the counter 106 are connected with the remaining adjacent rows of the matrix 108 except the last drive line. This line does not engage a corresponding line of cores and its function is explained later in this description. The counter 104 is employed to read out the contents of the matrix 108 in conjunction with the counter 106. Since the counter 106 advances one position for one complete cycle of the counter 104, a left to right read out of each line of the matrix 108 is achieved. Since the matrix 108 is employed to store a single character, the counter 104 is used to read successive columns of the stored character, and the counter 106 is used to read successive lines of the stored character.

Simultaneously with the application of a clock pulse to the clock 102, the processing unit applies a signal to a six-bit code storage unit 110 by means of a six-element line 112. The signal from the central processing unit 1 is in the normal machine format represented by a six-bit, two-level code. The unit 110 is connected to a decode matrix 114 by a six-element line 116. The matrix 114 decodes the machine format sent by the processing unit 1 and selects a signal line 117 which represents the Alpha-numerical Character sent by the unit 1. The line 117 is applied to the matrix 108 by means of an AND circuit 118. There are four inputs to the AND circuit 118, the first input signal is the energizing signal from the matrix 114, the second input signal is a clock pulse from the clock 102, the third input signal is a drive pulse from the sixth position of the counter 104, and the last signal is a drive signal from the eighth position of the counter 106. Upon the simultaneous application of these four signals, the energizing signal from the decode matrix 114 is applied to the core matrix 108. The line 117 threads a certain number of the magnetic cores employed by the matrix 108 in such a manner as to switch the states of these cores to represent the Alpha-numerical Character sent by the processing unit 1 and decoded by the matrix 114. For each different Alpha-numerical Character sent by the processing unit 1 and decoded by the matrix 114, there is a separate line 117 and a separate AND gate 118 employed to drive the matrix 108. A more complete description of this basic type character former 1 is found in U.S. Patent No. 2,820,956 to W. J. Rueger. However, the changes in operation in the particular type of character former employed in the present invention have been shown.

The Alpha-numerical Character is written into the magnetic cores of the matrix 108 by the energization of a single line threading the required cores. Additionally, the clock 102 continues to apply clock pulses to the counters 104 and 106. The simultaneous recycling of the counters 104 and 106 operate to scan the cores of the matrix 108. Since the counter 104 operates to scan successive columns of the matrix 108, it correspondingly scans successive columns of each character set up in the matrix. Additionally, since the counter 106 scans successive lines of cores in the matrix 108, it also scans successive lines of each character set up in the matrix. Under the simultaneous operations of the counters 104 and 106, the character set up in the matrix 108 is scanned, and signals representing this character are serially applied to a sense amplifier 119. The ending of a complete character scanning operation is indicated to the processing unit 1 from an "AND" gate 120. The gate 120 has two input signals, one of which is a drive signal from the sixth position of the counter 104, and the other of which is a drive signal from the seventh position of the counter 108.

A character counter 126 is driven by the counter 106 and it consists of a six-position binary counter of standard construction. A line counter 128 is driven by the counter 126 and it also consists of a six-position binary counter of standard construction. Upon each complete scan of magnetic cores in the matrix 108, the character counter 126 advances one position. For purposes of this disclosure, forty complete characters are located on one line. Therefore, upon the complete scanning of forty characters, the counter 126 completes one complete cycle, and the line counter 128 advances one position. The line counter 128 is set to count thirty lines and is reset upon reaching a count of 30.

The counter 126 is connected to a character analog converter 130 located in the terminal unit 12 by a six-element line identified as 132. The counter 128 is connected to a line analog converter 134 by a six-element line 136. A horizontal ramp circuit 138 is connected to the sixth position of the counter 104 by a line 139 and uses the drive signal from this position as a synchronizing signal. A vertical step circuit 140 is connected to the eighth position of the counter 106 by a line 141 and uses this drive signal as a synchronizing signal. Additionally, the step circuit 138 is connected to the ramp circuit 140 by a line 142, whereby a portion of the current generated in the horizontal ramp is transferred to the circuit 138 to achieve a step current configuration. A horizontal current adder 144 is connected to the converter 130 by a line 145 and is connected to the ramp circuit 138 by a line 146. A vertical adder 148 is connected to the line analog converter 134 by a line 149 and is connected to the vertical step circuit 140 by line 150.

The sense amplifier 119 is connected to an unblank terminator 151 located in the terminal 12. The current adder 144 is connected to a horizontal driver 152 located in the terminal 12 by a line 153 and is connected to a similar driver, not shown, located in the substations 17 and 17' by a line 154. The current adder 148 is connected to a second vertical current adder 155 by a line 156 and to a similar current adder 155 located in substations 17 and 17' by means of a line 157.

A manual line switching unit 158 is employed in the instant invention to give discrete voltage levels, which levels correspond to line adjustments on the display portion 99 of the tube 6. These discrete signals are applied to the vertical current adder 155. The ouput of the adder circuit 155 is applied to a vertical driver 160. The horizontal driver 152 is connected to the horizontal yoke of the display tube 6, and the vertical driver 160 is connected to the vertical yoke of the display tube 6 by means of a line 161.

The unblanked terminator 151 is connected to an unblank driver 162 located in the terminal 12 by means of a line 163 and is connected to an unblank driver, not shown, located in substations 17 and 17' by means of a line 164. The interlock circuit 5 operates to select a single display tube to receive the unblank signals carried by means of lines 163 and 164, the vertical positioning currents carried by means of lines 156 and 157, and the horizontal positioning currents carried by means of lines 153 and 154. This selection is achieved by energizing a voltage regulator 168 and the unblank driver 162 located in the selected terminal 12 or a similar voltage regulator and driver located in substations 17 and 17'. The circuits within the dotted line 12 indicates those circuits located in the terminal 12. Those circuits located with a second dotted line 170 are those circuits located within a substation 17 or 17'. The circuits within the dotted line 12 and without the line 170 are exclusively located in the terminal 12, but are shared by the substations 17 and 17' by means of the current switching to be described in connection with FIG. 4.

In operation, it is the function of the central processing unit 1 to search and answer requests made from one of a plurality of terminals or substations. In performing its answering function, it transmits one character at a time of the requested data in machine format to a character former control unit 2. It is the function of the unit 2 to change the format of the character from the machine format into a format which can be displayed on a tube 6. The display format is a 35 bit serial code 5 x 7 dot matrix representing the character sent by the unit 1. When these bits are recombined and displayed on the tube 6, they visually represent the character transmitted by the unit 1. It is the functioning of the counters 126 and 128 to select successive areas on the display portion 99 of the tube 6 upon which each successive character is displayed. It is the function of the ramps 140 and 138 to generate positioning currents for the scanning of each character area on the display portion 99 of the tube 6. Additionally, it is the function of the unblank driver 162 to control the writing of the character on the face of the tube in response and in synchronism with the format generated by the character former control unit 2. And finally, the interlock 5 switches the positioning current from the terminal 12 to the substation 17 by activating the unblank driver 162 and the voltage regulator 168 located in the substation 17.

The operation of the circuitry shown in FIG. 3 has been described as only operating to display data from the processing unit. However, the request from the keyboard may be displayed also as indicated by a six-element line 173 connecting the keyboard 8 to the storage unit 110.

Referring in more detail to FIG. 4 there can be seen the voltage sharing circuit and the current combining circuit employed in the instant invention. The drive signal available at position 6 of the character column counter 104 is applied to the horizontal ramp circuit 138. The ramp circuit 138 is a sawtooth generator of standard construction and generates a linear ramp voltage. The drive signal available at position 8 of the character line counter 104 is applied to a vertical ramp circuit 182 which is similar in construction of the ramp 138. An inherent difference is the period of the ramp. The period of the ramp generated by the circuit 182 is an even multiple of the ramp generated by the circuit 138. A multiple of seven is employed in this invention. The vertical step circuit 140 includes the vertical ramp 182 and a current sharing circuit which employs a plurality of transistors 184 through 188.

The collector leads of the transistor 184 and 185 are connected to a common load resistor 189. The emitter lead of the transistor 184 is connected to ground 19 by a series connection of a fixed resistor 190 and a variable resistor 191. The emitter lead of the transistor 185 is connected to the junction of the resistor 190 and 191 by a fixed resistor 192. The emitter lead of the transistor 187 is connected to ground 19 by a series connection of a fixed resistor 194 and a variable resistor 196. The emitter lead of the transistor 188 is connected to the junction of the resistors 194 and 196 by a resistor 198. The emitter of the transistor 186 is connected to ground by a series connection of a fixed resistor 200 and a variable resistor 202. The collectors of the transistors 187 and 188 are connected in common to one end of a resistor 204. The collector of the transistor 186 is connected to the other end of the resistor 204. The collector of transistor 185 is connected to the base of transistor 186. The bases of the transistors 184 and 185 are connected together, and the bases of the transistors 187 and 188 are similarly connected. The remaining end of resistor 189 is connected to a current combining transistor 212 and the junction between the collector of the transistor 186 and the resistor 204 is connected to a second current combining transistor 214. The transistors 184 and 185 and 187 and 188 are connected in parallel to handle the amount of current required in the operation of this circuit. Obviously, a single transistor having a higher power rating could be substituted for each pair of transistors.

The ramp circuit 182 generates a ramp voltage which has a period equal to an even multiple of the period of the ramp voltage generated by the ramp circuit 138. The resistors 194, 196 and 198 and the voltage generated by the ramp circuit 182 determine a ramp current flowing through the resistor 204. The emitter follower action of the transistors 184 and 185, the voltage generated by the ramp circuit 138, and the resistors 190, 191 and 192 determine a ramp current flowing through the resistor 189. The current flow through the resistor 189 produces an inverted horizontal ramp voltage for application to the base of the transistor 186. By adjusting the value of the resistor 202, a ramp current can be obtained from the collector lead of the transistor 186 which has a slope equal to minus the slope of the current flowing through resistor 204. The current flowing from the collector lead of transistor 186 and the current flowing through the resistor 204 are applied to the emitter lead of the transistor 214. Since the slope of the current flowing from the transistor 186 is negative to that of the current flowing through the resistor 204, while the vertical ramp 182 is sweeping, the combined currents will remain constant until the voltage applied from the horizontal ramp 138 is returned to ground to begin a new sweep.

The counter 128 is shown having each of its six-positions connected to a separate driver in a driver circuit 215. Each driver circuit is connected to a separate precision resistor in a precision resistor circuit 216. The combined operation of a driver 215 and its respective resistor 216 converts the digital signals from the counter 128 into a current value. Each precision resistor generates a weighted current such as to represent a certain horizontal movement on the portion of the display tube 6. The output of the precision resistors are also applied to the emitter of the combining transistor 212.

Each position of the counter 126 is shown connected to a precision resistor in a precision resistor circuit 218 by means of a separate driver in a driver circuit 220. The driver circuit 220 and the precision resistor circuit 218 perform the functioning of the character analog converter 130. The output of the converter 130 represents discrete horizontal changes across the display portion 99 of a display tube 6. The outputs of the precision resistors 218 are applied to the emitter lead of the transistor 214.

A voltage regulator 222 is connected to the base lead of the transistor 212 and the base lead of the transistor 214. The transistor 212 combines the current flowing from the precision resistors 216 and the current flowing from the resistor 189. The combined horizontal positioning current is applied to a horizontal yoke driver transistor 216*a* located in the terminal 13 by means of a line 223 or to a driver located in a substation 17 by means of a line 224. The current combining transistor 214 combines the currents flowing from the precision resistors 218, the transistor 186 and the resistor 204, and it applies the combined current to the vertical yoke driver transistor 226 by means of a line 228. The yoke driver transistor 226 is located in the terminal 13. The current from the transistor 214 is also applied to a similar driver located in the substation 17 by means of a line 230.

A manual line adjustment circuit 232 is connected to the emitter of a driver transistor 234. The adjustment circuit 232 consists of a plurality of resistors connected in parallel to a fixed voltage source. The value of such resistor is different and the value of the selected resistor determines the amount of current furnished to the emitter of the transistor 234. Additionally, the transistor 234 and an additional transistor 236 are employed to adjust the vertical and horizontal balance of the currents flowing in the vertical and horizontal yokes 238 and 240 respectively. Variable resistors 242 and 244 are used to determine the balancing currents for the horizontal and vertical yokes respectively. The collector leads of the transistor 216*a* and the transistor 236 are connected in common to the horizontal yoke 240 of a tube 6. The collector leads of the transistors 234 and 226 are connected in common with the vertical yoke 240 of the tube 6. A voltage regulator circuit 246 is connected to the base lead of the transistors 216*a*, 236, 234 and 226, the other side of the voltage regulator is connected to position 6 of the interlock relay 50 shown in FIG. 2.

In operation, the counters 128 and 126 produce discrete horizontal and vertical deflection signals in binary form. These signals are applied respectively to drivers 215 and 220. The activated drivers generate precision positioning currents by means of their associated precision resistor circuits 216 and 218.

Concurrently, the horizontal ramp circuit 138 and the vertical step circuit 140 are generating continuous scanning currents for each discrete character position. The horizontal currents are combined in the transistor 212 and the vertical currents are combined in the transistor 214. The interlock circuit 5 operates to close position 6 of the relay 50, thereby connecting the output of the voltage regulator 246 to the bases of the transistor 216, 236, 234 and 226. Upon the activation of these last-mentioned transistors, the positioning currents are applied to the yokes 238 and 240 of the display tube 6 and its electron beam is directed over its display area 99. The circuitry located within the dotted line 248 is also located in the substation 17.

The embodiment shown in FIG. 4 employs circuitry sufficient to drive the pair of single ended yokes 238 and 240. The present invention may be expanded to drive these yokes in push pull configuration.

The line adjust switch 232 is employed to move the electron beam of a display tube 6 to various line positions. As previously mentioned, the display area 99 is divided into thirty lines. It has been found practical to equip the switch 232 with ten positions and give each position a current weight of three lines. The display tube 6 retains the written information for a considerable length of time. In order to erase this information, it is necessary to activate an integral heater circuit attached to each display tube. Since an erasure takes a considerable amount of time, it is not always practical to erase each individual answer from the central processing unit, especially if it is a very short answer. Therefore, the line adjust switch 232 designates the line on which each separate answer from the CPU will be written. This is necessary because otherwise each answer would begin at the top left corner of the display tube and would overlap. In this manner, several short messages can be written on the display portion of a tube before it is necessary to erase the tube. Additionally, since the previous inquiries can also be displayed on the tube, it is possible to refer back to these inquiries at a later time if the need arises.

Referring to FIG. 5, there can be seen the transmitting portion 260 of the long distance driver employed in the instant invention. This portion of the driver is associated with the sense amplifier 119 shown in FIG. 3 and is employed to transfer the unblank signals from the amplifier 119 to the unblank terminator 151 located in the terminal 12. The circuitry shown in FIG. 5 within the dotted lines 119 and 12 relates to a long line driver suitable for use in the transmission of all digital signals between stations. This circuitry is fully described in our copending application entitled "Transistor Long Line Driver-Terminator," Ser. No. 332,397, filed Dec. 23, 1963, now Patent No. 3,254,237. Additionally, the interlock connection from position 55 of relay 50 is shown. This position cuts off the display tube of all the display stations which have not been selected. However, for the selected substation 17, the relay 50 opens its normally closed connection between contacts 55 and 55*a* and permits the unblank signals from the sense amplifier 119 drive the high voltage cathode driver in substation 17.

FIGS. 6 and 7 show selected waveforms from the instant invention, and FIGS. 8 and 9 show the display area 99 of the dark trace cathode ray tube employed in the instant invention with data written thereon. The writing of an E character on the display portion 99 will be described by reference to FIGS. 2 and 3 to the timing diagrams in FIGS. 6 and 7.

Upon the activation of substation 17, a data request signal is sent to the processing unit 1 by means of line 20. The unit 1 responds with an enter signal on line 22, a character signal on line 112, and a clock start pulse to the clock circuit 102. The clock generates a series of clock signals which are applied to a character column counter 104 which operates at the same rate as the clock signals. The character line counter 106 advances one position in response to a complete cycle of the character column counter 104.

When the character column counter 104 is at position 6, and the character line counter is at position 8, a character transfer signal occurs, which signal sets up the character E in the matrix 108. At this same time, both the character counter 126 and the line counter 128 are in their zero positions as seen on the last two waveforms in FIG. 7. Additionally, the horizontal scanning current waveform and the vertical scanning current waveform begin from their respective zero conditions as seen on the last two waveforms in FIG. 6. This position is identified as point 270 on FIG. 8. Thereafter, five unblanking signals occur while the column counter advances through its first five positions and the character line counter remains in its first position. The unblank signals are transferred to the unblank driver 151 located in the activated station. Concurrent with the generation of these five unblank signals, the horizontal scanning current has completed a complete cycle and the vertical scanning current has completed its first step in its current ladder configuration. The horizontal scanning current moves the electron beam across the first line of the first character position and the unblank signals write the first line portion of the character E.

The horizontal sync signal occurs during the sixth position of the character line counter, causing the horizontal scanning current waveform to return to zero and the vertical scanning current waveform to rise in its step configuration. The electron beam is now in position to move across the second line of the first character position and write an additional portion of the character E. In this manner seven lines of unblank signals are employed to write the character E in the first character position.

Referring to FIG. 7, several of the same waveforms shown in FIG. 6 are shown again. However, the time scale has been enlarged in order to show the writing of several characters on the display portion of the dark trace tube.

Upon the completion of the writing of the character E on the tube, a cycle request signal is sent out over line 120, as seen in FIG. 3, to the processing unit 1. This signal indicates that the display circuits are ready to write a second character on the display tube. A clock start signal is again received by the clock 102 and the counters begin to advance.

It should be noted now that the character counter now advances to its one position and the line counter remains in its zero position. The second character is written on the tube. Thereafter successive characters are written on the first line of the tube until it is filled, upon the writing of forty characters. At this time, the line counter advances to its first position and the second line is begun. In this manner the entire area of the display portion of the tube may be completely filled.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system of the type having a central processing unit operating to store a plurality of data files in machine format, and one of said data files comprises a plurality of alphanumerical characters, a data retrieval system, comprising,
  - a plurality of first stations connected in common to said central processing unit,
  - second stations connected to at least certain of said first stations,
  - each station including a keyboard for entering a request into said processing unit for one of said data files,
  - a dark trace display tube associated with each of said stations and equipped with a suitable portion for displaying the requested data file,
  - control means including manually operable means in each of said stations for activating one of said stations and for locking out the remaining of said stations,
  - character forming means common to all of said stations and responsive to said central processor for translating said machine format of said requested data characters into a display format representative of the visual image of each of said data characters,
  - each of said display tubes being equipped with an electron beam forming means and a horizontal magnetic deflection yoke and a vertical magnetic deflection yoke,
  - unblanking means associated with each of said tubes and responsive to said control means and said character forming means for activating said beam forming means of said activated station and for producing beam operation at said activated station corsesponding to said display format,
  - said yokes of said activated station being operative in moving its associated beam across the display portion of its corresponding tube,
  - counter means connected in common to all of said stations for producing discrete first horizontal and vertical deflection signals,
  - means in each of said first stations responsive to said counter means for producing first horizontal deflection currents operative for moving its corresponding beam in discrete successive horizontal movements,
  - means in each of said first stations responsive to said counter means for producing first vertical deflection currents operative for movins its corresponding beam in discrete successive vertical movements,
  - ramp means in each of said first stations producing second horizontal and vertical deflection currents for continuously moving said beam between said discrete successive horizontal movements,
  - a first combining means in each of said first stations responsive to said first and said second horizontal deflection currents,
  - a second combining means in each of said first stations responsive to said first and said second vertical deflection currents,
  - a first driver in each of said stations connected to its associated horizontal yoke and responsive to said first combining means,
  - a second driver in each of said stations connected to its associated vertical yoke and responsive to said second combining means,
  - current switching means responsive to said control means and operative to activate said first and second driver in said activated station, whereby the deflection currents generated in said first stations are available at each of its associated second stations for writing the requested data characters at said activated stations.

2. A data retrieval system as recited in claim 1, wherein said current switching means comprises,
  - a voltage regulator.

3. A data retrieval system as recited in claim 1, wherein each of said current combining means comprises,
  - a transistor having base, collector and emitter leads,
  - a regulated source of voltage connected to said base lead,
  - a first current source being connected to said emitter lead,
  - a second current source being connected to said emitter lead, and
  - a load being connected to said collector lead, whereby said load is driven by a current equal to the currents from said first and second current sources.

4. In a data processing system of the type having a central processing unit operating to store a plurality of data files in machine format, and one of said data files comprises a plurailty of alphanumerical characters, a data retrieval system, comprising,
  - a plurality of first stations connected in common to said central processing unit,
  - second stations connected to at least certain of said first stations,
  - each station including a keyboard for entering a request into said processing unit for one of said data files,
  - a dark trace display tube associated with each of said stations and equipped with a suitable portion for displaying the requested data file,
  - control means including manually operable means in each of said stations for activating one of said stations and for locking out the remaining of said stations,
  - character forming means common to all of said stations and responsive to said central processor for translating said machine format of said requested data characters into a display format representative of the visual image of each of said data characters,
  - each of said display tubes being equipped with an electron beam forming means and a horizontal magnetic deflection yoke and a vertical magnetic deflection yoke,
  - unblanking means associated with each of said tubes and responsive to said control means and said character forming means for activating said beam forming means of said activated station and for producing beam operation at said activated station corresponding to said display format,
  - said yokes of said activated station being operative in moving its corresponding beam across the display portion of its corresponding tube,
  - a first counter means common to all stations for producing first discrete horizontal deflection signals,
  - a second counter means common to all stations for producing first discrete vertical deflection signals,
  - means in each of said first stations responsive to said first counter means for producing first horizontal deflection currents operative for moving its associated beam in discrete successive horizontal movements,
  - means in each of said first station responsive to said second counter means for producing first vertical deflection currents operative for moving its associated beam in discrete successive vertical movements,
  - a first ramp means in each of said first stations for producing second horizontal deflection currents for continuously moving said beam across said display portion of said tube between said discrete successive horizontal movements,
  - a second ramp means in each of said first stations,
  - current-sharing means responsive to said first ramp means and said second ramp means for altering the operation of said second ramp means and for producing a second vertical deflection step current for moving said beam down said display portion of said tube for a multiple of said second horizontal movements, a first combining means in each of said first stations being responsive to said first and said second horizontal deflection currents, a second combining means in each of said first stations being responsive to said first and said second vertical deflection currents, current switching means responsive to said control means and operative to selectively connect said first and said second combining means to said yokes in said activated station, whereby only said activated station receives said deflection currents.

5. A data retrieval system as recited in claim 4, wherein said current-sharing means comprises, a ground connection, a first transistor having base, emitter and collector leads, said base lead being connected to said first ramp means, a first resistor connected between said emitter lead and said ground for determining a first ramp current, a second resistor connected between said collector and said first combining means, a second transistor having base, emitter and collector leads, said base lead of said second transistor being connected to said second ramp means, a third resistor connected between said emitter lead of said second transistor and said ground for determining a second ramp current, a fourth resistor connected between said collector lead of said second transistor and said second combining means for producing a second inverted ramp voltage, a third transistor having base, emitter and collector leads, said base of said second transistor being connected to said second inverted ramp voltage, a fifth resistor connected between said emitter of said third transistor and said ground potential for obtaining a third ramp current having a slope equal to minus the slope of said first ramp current, and said collector lead of said third transistor being connected to said second combining means, whereby the sum of said second and said third ramp currents is a step current.

6. In a data processing system of the type having a central processing unit operating to store a plurality of data files in machine format, and one of said data files comprises a plurality of alphanumerical characters, a data retrieval system, comprising, a plurality of first stations connected in common to said central processing unit, second stations connected to at least certain of said first stations, each station including a keyboard for entering a request into said processing unit for one of said data files, a dark trace display tube associated with each of said stations and equipped with a suitable portion for displaying the requested data file, control means including manually operable means in each of said stations for activating one of said stations and for locking out the remaining of said stations, character forming means common to all of said stations and responsive to said central processor for translating said machine format of said requested data characters into a display format representative of the visual image of each of said data characters, each of said display tubes being equipped with an electron beam forming means and a horizontal magnetic deflection yoke and a vertical magnetic deflection yoke, low voltage unblanking means in each of said first stations responsive to said character forming means, high voltage unblanking means in each of said stations responsive to said low voltage means and to said control means for producing beam operation at said activated station, said yokes of said activated station being operative in moving its corresponding beam across the display portion of its corresponding tube, a first binary counter having a plurality of positions connected in common to all stations for producing first discrete horizontal deflections signals, a second binary counter having a plurality of positions and connected in common to all stations for producing first discrete vertical deflections signals, first current generating means in each of said first stations responsive to said first counter means for producing first horizontal deflection currents operative for moving its associated beam in discrete successive horizontal movements, second current generating means in each of said first stations responsive to said second counter means for producing first vertical deflection currents operative for moving its associated beam in discrete successive vertical movements, each of said current generating means including a driver circuit responsive to each of said positions in said counter means and a precision resistor connected to each driver for producing a precision deflection current, a first ramp means in each of said first stations for producing second horizontal deflection currents for continuously moving said beam across said display portion of said tube between said discrete successive horizontal movement, a second ramp means in each of said first stations, current-sharing means responsive to said first ramp means and said second ramp means for altering the operation of said second ramp means and for producing a second vertical deflection step current for moving said beam linearly down said display portion of said tube for a multiple of said second horizontal movements, a first combining means in each of said first stations being responsive to said first and said second horizontal deflection currents, a second combining means in each of said first stations responsive to said first and said second vertical deflection currents, manual operable means in each of said stations for producing one of a plurality of discrete vertical deflection currents of predetermined constant value for selecting the initial vertical position of its associated beam, third combining means in each of said stations responsive to said second combining means and said manual operable means, horizontal yoke driver means in each of said stations responsive to said first combining means, vertical yoke driver means in each of said stations responsive to said third combining means, and current switching means responsive to said control means and operative to activate said horizontal and said vertical yoke driver means of said activated station.

References Cited

UNITED STATES PATENTS

| | | | |
|---|---|---|---|
| 2,495,452 | 1/1950 | Grove | 340—147 |
| 2,570,475 | 10/1951 | Ostreicher et al. | 178—6 |
| 2,594,731 | 4/1952 | Connolly | 340—324.1 |

(Other references on following page)

UNITED STATES PATENTS

| | | | |
|---|---|---|---|
| 2,920,312 | 1/1960 | Gordon et al. | 340—324.1 |
| 2,987,715 | 6/1961 | Jones et al. | 340—324.1 |
| 3,090,041 | 5/1963 | Chiang | 340—324.1 |
| 3,109,166 | 10/1963 | Kronenberg | 340—324.1 |
| 3,175,208 | 3/1965 | Simmons | 340—324.1 |

OTHER REFERENCES

Weber, E. V.: Displaying Information on a CRT IBM Technical Disclosure, p. 27, vol. 4, No. 8, January 1962.

NEIL C. READ, *Primary Examiner.*

A. J. KASPER, *Assistant Examiner.*